US012596537B2

(12) United States Patent
Voss et al.

(10) Patent No.: US 12,596,537 B2
(45) Date of Patent: Apr. 7, 2026

(54) GENERALIZED INTERMEDIATE AND LOWER LEVEL SOURCE CODE REPRESENTATIONS FOR STATIC APPLICATION SECURITY TESTING

(71) Applicant: MICRO FOCUS LLC, Santa Clara, CA (US)

(72) Inventors: Caleb Andrew Voss, Doraville, GA (US); Franciscus Henricus Arnoldus van Buul, Montfoort (NL); Trang Indie To, Santa Clara, CA (US)

(73) Assignee: Micro Focus LLC, Wilmington, DE (US)

( * ) Notice: Subject to any disclaimer, the term of this patent is extended or adjusted under 35 U.S.C. 154(b) by 128 days.

(21) Appl. No.: 18/498,961

(22) Filed: Oct. 31, 2023

(65) Prior Publication Data

US 2025/0138797 A1      May 1, 2025

(51) Int. Cl.
*G06F 9/44*          (2018.01)
*G06F 8/51*          (2018.01)
(52) U.S. Cl.
CPC ...................................... *G06F 8/51* (2013.01)
(58) Field of Classification Search
CPC .......................................................... G06F 8/51
See application file for complete search history.

(56) References Cited

U.S. PATENT DOCUMENTS

| | | | |
|---|---|---|---|
| 7,150,008 B2 | 12/2006 | Cwalina et al. | |
| 8,806,453 B1 * | 8/2014 | Bodkin ..................... | G06F 8/51 |
| | | | 717/136 |
| 11,106,440 B2 * | 8/2021 | Beit-Aharon ............. | G06F 8/51 |
| 11,216,256 B2 | 1/2022 | Smiljanic et al. | |
| 12,373,558 B1 * | 7/2025 | Long ..................... | G06F 21/563 |
| 2008/0216060 A1 * | 9/2008 | Vargas ..................... | G06F 8/51 |
| | | | 717/137 |
| 2017/0212829 A1 | 7/2017 | Bales et al. | |
| 2025/0004909 A1 * | 1/2025 | Pan ..................... | G06F 11/3684 |

FOREIGN PATENT DOCUMENTS

| | | |
|---|---|---|
| CN | 113254945 A | 8/2021 |
| CN | 110727598 B | 3/2022 |

* cited by examiner

*Primary Examiner* — Qamrun Nahar
(74) *Attorney, Agent, or Firm* — Sheridan Ross P.C.

(57)          ABSTRACT

Source code in a programming language is received. The source code is converted to a generalized intermediate level representation not specific to any programming language. The source code is converted from the generalized intermediate level representation to a generalized lower level representation adapted to a dataflow analysis portion of static application security testing (SAST). The generalized lower level representation is also not specific to any programming language.

18 Claims, 9 Drawing Sheets

FIG 3A

```
class Test { int foo (boolean flag1, boolean flag2, int x) { if (flag1)
      doX();
    else {
      if (flag2)
        doY();
      doZ();
    } return x + 42;
  } static void doX () {}
  static void doY () {}
  static void doZ () {}

```
// Example Java IR model.

JavaRoot {

JavaClass "Test" {

JavaMethod "foo" {
   static: false
   returnType: int
   arguments: [("flag1", boolean), ("flag2", boolean), ("x", int)]
   definition:
    JavaBlock [
     JavaIf {
       condition: JavaVariableAccess("flag1")
       then: JavaCall "Test.doX()" []
       else:
        JavaBlock [
         JavaIf {
           condition: JavaVariableAccess("flag2")
           then: JavaCall "Test.doY()" []
           else: null
         },
         JavaCall "Test.doZ()" []
        ]
     },
     JavaReturn(JavaBinaryOperation(INTEGER_PLUS, JavaVariableAccess("x"),
JavaIntegerLiteral(42)))
    ]
  }

JavaMethod "doX" {
   static: true
   returnType: void
   arguments: []
   definition: JavaBlock []
  }

```
// Example MIR model.
MIRRoot {

MIRGroup "Test" {

MIRFunction "foo" (%0) {
      let flag1 := %0.<arg:0> in
      let flag2 := %0.<arg:1> in
      let x := %0.<arg:2> in
      let this := %0.<this> in sequence [          // 2 actions in sequence: 1) the outer if-then-else, 2) setting
the return value
        if (flag1) {
          direct call "Test" :: "doX" (<alloc>);
        } else {
          sequence [          // 2 actions in sequence: 1) the inner if-then, 2) call to doZ()
            if (flag2) {
              direct call "Test" :: "doY" (<alloc>);
            },
            direct call "Test" :: "doZ" (<alloc>);
          ]
        },
        %0.<return> = binaryOperation("ir0-int-+", x, constantOperation("ir0-int-literal",
42));
      ]
    }

MIRFunction "doX" (%0) {
    }

```
// Example IR model.
IR0Root {

IR0Group "Test" {

IR0Function "foo" (%0) {
  block(0):
   %1 = %0.<arg:0> // flag1
   %2 = %0.<arg:1> // flag2
   %3 = %0.<arg:2> // x
   %4 = %0.<this>  // this (implicit)
   cond branch (%1) block(1), block(2)

block(1):
   %5 = <alloc>
   call "Test" :: "doX" (%5)
   branch block(3)

block(2):
   cond branch (%2) block(4), block(5)

block(4):
   %6 = <alloc>
   call "Test" :: "doY" (%6)
   branch block(5)

block(5):
   %7 = <alloc>
   call "Test" :: "doZ" (%7)
   branch block(3)

block(3):
   %8 = constant ir0-int-literal 42
   %9 = binop ir0-int-+ %3 %8   // x + 42

%0.<return> = %9
   return
  }

IR0Function "doX" (%0) {
  block(0):
   return
  }
 }
```

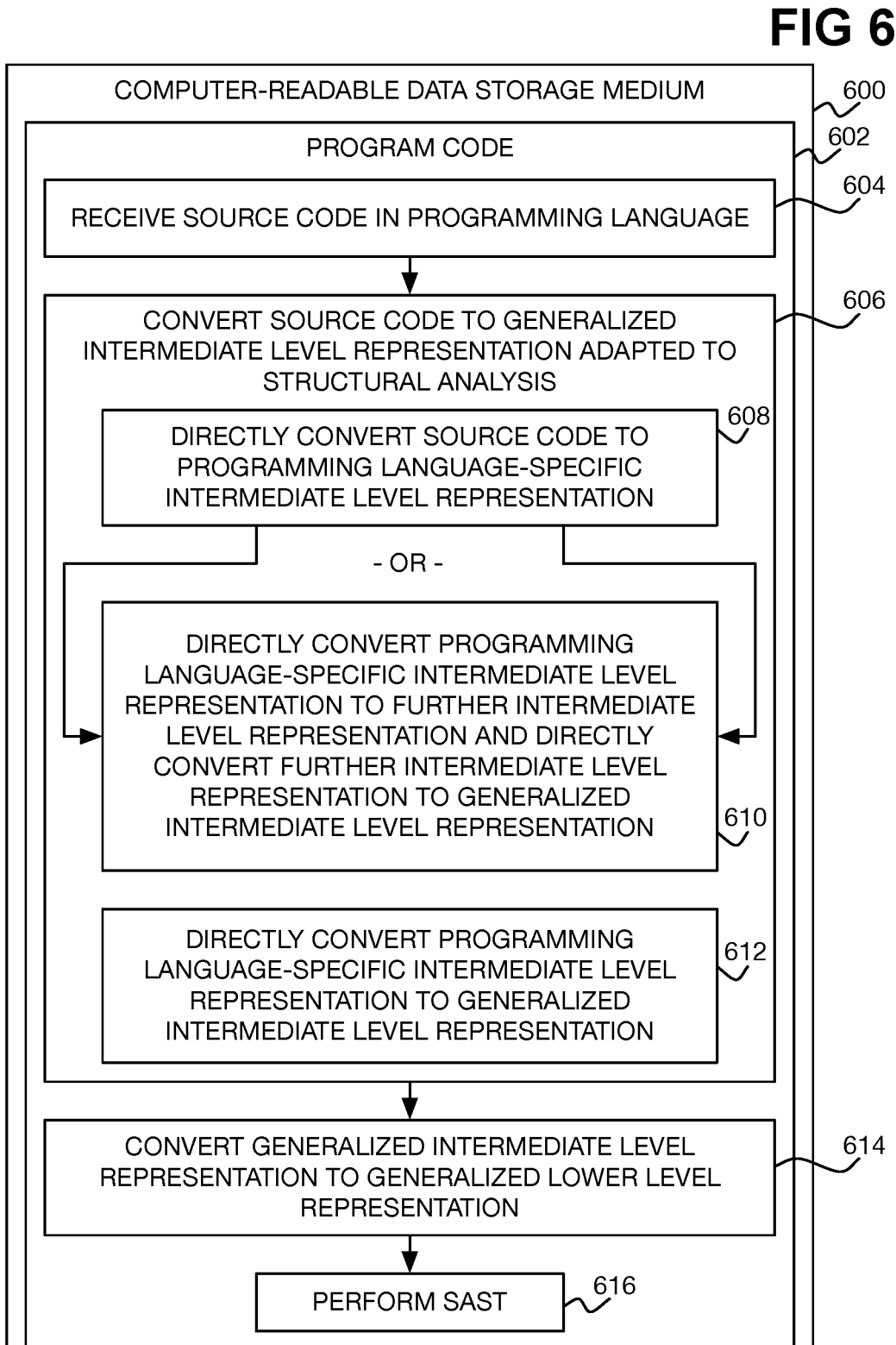

COMPUTER-READABLE DATA STORAGE MEDIUM                    600

PROGRAM CODE                                             602

RECEIVE SOURCE CODE IN PROGRAMMING LANGUAGE             604

CONVERT SOURCE CODE TO GENERALIZED INTERMEDIATE LEVEL REPRESENTATION ADAPTED TO STRUCTURAL ANALYSIS          606

DIRECTLY CONVERT SOURCE CODE TO PROGRAMMING LANGUAGE-SPECIFIC INTERMEDIATE LEVEL REPRESENTATION          608

- OR -

DIRECTLY CONVERT PROGRAMMING LANGUAGE-SPECIFIC INTERMEDIATE LEVEL REPRESENTATION TO FURTHER INTERMEDIATE LEVEL REPRESENTATION AND DIRECTLY CONVERT FURTHER INTERMEDIATE LEVEL REPRESENTATION TO GENERALIZED INTERMEDIATE LEVEL REPRESENTATION          610

DIRECTLY CONVERT PROGRAMMING LANGUAGE-SPECIFIC INTERMEDIATE LEVEL REPRESENTATION TO GENERALIZED INTERMEDIATE LEVEL REPRESENTATION          612

CONVERT GENERALIZED INTERMEDIATE LEVEL REPRESENTATION TO GENERALIZED LOWER LEVEL REPRESENTATION          614

PERFORM SAST          616

GENERALIZED INTERMEDIATE AND LOWER LEVEL SOURCE CODE REPRESENTATIONS FOR STATIC APPLICATION SECURITY TESTING

BACKGROUND

Computing devices like desktops, laptops, and other types of computers, as well as mobile computing devices like smartphones, among other types of computing devices, run software, which can be referred to as applications, to perform intended functionality. An application may be a so-called native application that runs on a computing device directly, or may be a web application or "app" at least partially run on a remote computing device accessible over a network, such as via a web browser running on a local computing device. An application can be tested, or analyzed, in a variety of different ways to ensure that the application correctly performs its intended functionality as well as to ensure that the application does not have any potential security vulnerabilities.

BRIEF DESCRIPTION OF THE DRAWINGS

FIG. 3A is a diagram of example source code in the Java programming language.

FIG. 3B is a diagram of an example programming language-specific intermediate level representation of the Java source code of FIG. 3A.

FIG. 3C is a diagram of an example generalized intermediate level representation of the Java source code of FIG. 3A that can be generated from the programming language-specific intermediate level representation of FIG. 3B.

FIG. 3D is a diagram of an example generalized lower level representation of the Java source code of FIG. 3A that can be generated from the lower level representation of FIG. 3C.

FIG. 6 is a diagram of an example non-transitory data storage medium storing program code for generating intermediate level representations and a generalized lower level representation of source code for performing SAST of the source code.

DETAILED DESCRIPTION

Figure 1:
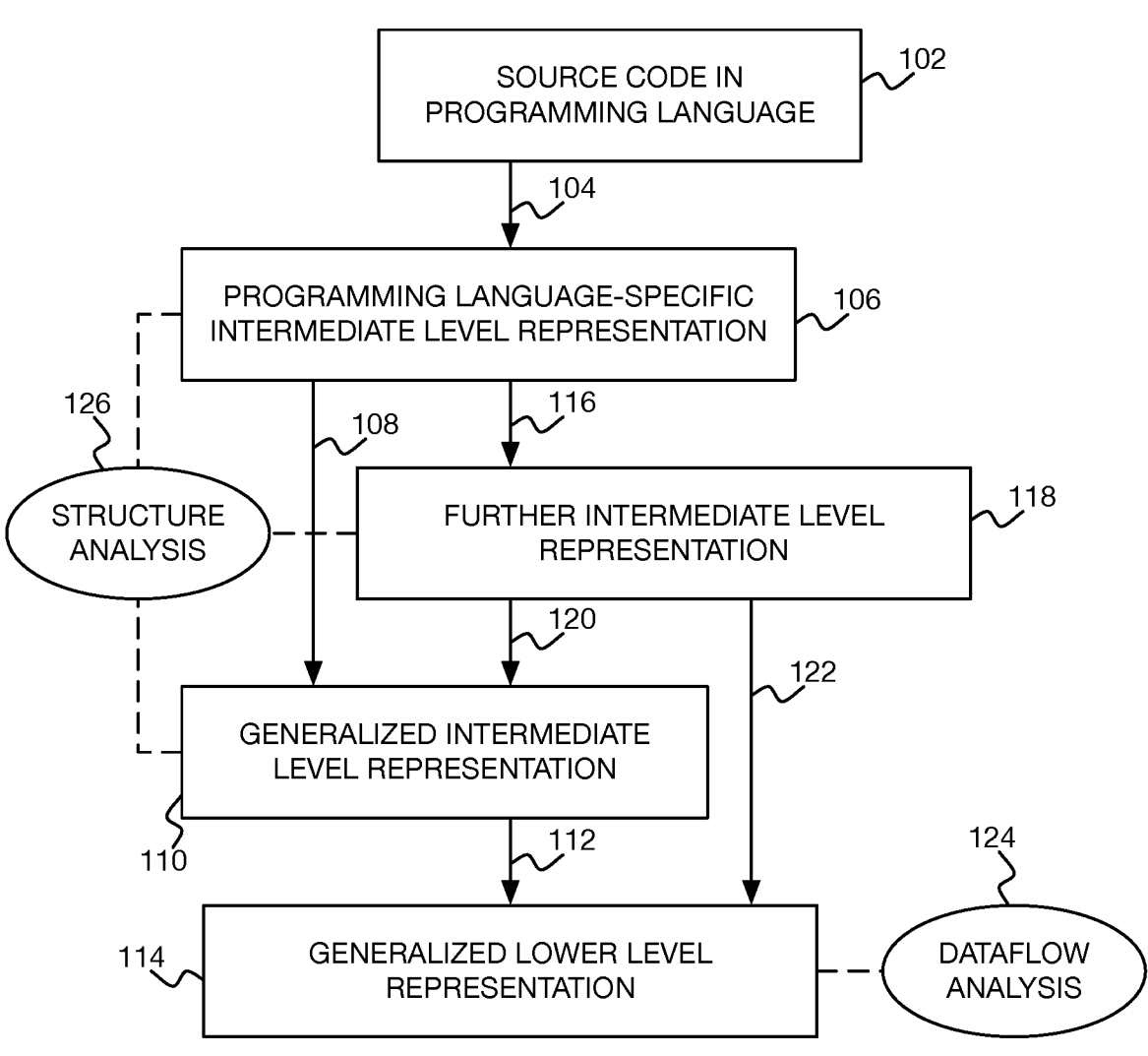
FIG. 1 is a diagram of example intermediate and lower level representations of source code for static analysis security testing (SAST).

As noted in the background, an application can be tested to ensure that it performs its intended functionality as well as to ensure that it does not have any potential security vulnerabilities. One type of application testing that is performed particularly to identify potential security vulnerabilities is known as static application security testing (SAST). SAST involves analyzing the source code of an application to determine whether, upon generation of executable code from the source code, subsequent execution of the application will have potential security vulnerabilities. SAST is static in that the application is not actually executed (i.e., executable code for the application is not generated from the source code and/or is not executed) to identify security vulnerabilities. In other words, SAST utilizes only the source code of an application and does not consider the application when it is actually running.

Other, non-SAST techniques include, among others, dynamic application security testing (DAST) and interactive application security testing (IAST). DAST identifies security vulnerabilities within an application as the application is running (i.e., during execution of the executable code for the application), such as in a production environment in which the application is being used by end users. Unlike SAST, DAST utilizes only the executable code of the application and considers the application when it is actually running. IAST identifies security vulnerabilities within an application during automated or human-assisted testing of the application while the application is running, and can potentially identify the source code responsible for identified security vulnerabilities. Unlike SAST and like DAST, IAST utilizes the executable code of the application and considers the application when it is actually running, but unlike DAST can reference the source code of the application.

SAST can include both structural analysis as well as dataflow analysis. Structural analysis considers the structure of an application based on its source code, whereas dataflow analysis considers the behavior of the application based on its source code. For instance, SAST can involve generating a logical representation of the source code of an application, such as an abstract syntax tree (AST) that may ordinarily be the output of the preliminary stage of a compiler that generates executable code from the source code. The AST corresponds to the textual structure of the source code.

Then, a semantic representation of all possible behaviors, or control paths, through the application is generated. For example, the semantic representation may flatten the nested tree structure of the AST into sequences of instructions arranged in a control flow graph (CFG) for each function in the source code. Each path through the CFG encodes one such possible path, such that the collection of all the paths capture the behaviors of the application.

The structural analysis portion of SAST is operative on the AST of the source code—i.e., on the textual structure—whereas the dataflow analysis portion is operative on the CFG. As a concrete example, one type of security vulnerability for which application source code can be tested using SAST is taint analysis. Taint analysis identifies locations at which potentially harmful data may be introduced into an application, which are known as taint sources, and locations at which the potentially harmful data of such taint sources may cause harm, which are known as taint sinks, when the application is executed. A line of code that reads a password may be considered a taint source, and output of that password to a console or log file in cleartext may be considered a taint sink.

For taint analysis, the structural analysis portion of SAST identifies taint sources and taint sinks within the application. By comparison, the dataflow analysis portion identifies whether unsafe data flows resulting from execution paths of the application can potentially result in such taint sources reaching taint sinks. The results of the structural and dataflow analysis portions can thus identify security vulnerabilities regarding taint within the application.

So that the same SAST solution or tool can be used with source code in different programming languages, a universal intermediate level representation may be desired to be defined, to which source code can be converted and represented regardless of programming language. The SAST tool in question thus would have a converter (e.g., executable code) specific for each programming language that it supports, to convert source code from that programming language to the universal intermediate level representation. The solution or tool would then need just a single converter to convert the universal intermediate level representation to CFG.

However, in actuality, such a universal intermediate level representation would likely fail to satisfy all requirements needed to realize a tool that can effectively perform SAST on source code of a wide variety of different programming languages. For example, the universal intermediate level representation should be versatile, such that it does not assume a traditional programming language paradigm such as that of Java or C#, but also supports functional, declarative, and dynamic languages. The representation should be simple, such that it does not just include every feature of every programming language, but rather includes a minimal set of features to which all programming languages can be reduced.

The universal intermediate level representation should further have naturalness in that conversion of source code in a given programming language to the universal intermediate level representation should be direct and straightforward to avoid unnecessary difficulty and duplication in developing the programming language-to-intermediate level representation converters. However, the universal intermediate level representation should nevertheless preserve structure within source code in a predictable and recognizable manner, since structural analysis has to identify features of interest in the syntactic organization of an application.

Finally, the universal intermediate level representation should provide for semantic clarity, in that, since the meaning of an application is modeled using a CFG constructed directly from the universal intermediate level representation, the language features in the universal intermediate level representation should have single well-defined behaviors. That is, similar constructs in different programming languages cannot reduce to the same universal intermediate level representation if they have semantic differences that correspond to different behavior. Otherwise, the universal intermediate level representation cannot be converted to the CFG without referencing other information regarding the application, which defeats the purpose in converting the source code to the universal intermediate level representation.

In practicality, no universal intermediate level representation can satisfy these constraints. A higher level universal intermediate level representation that is similar to a programming language like Java may be able to satisfy the criteria for Java and similar programming languages, but not be useful for other, more disparate programming languages. A lower level universal intermediate level representation that is more akin to assembly language may be usable for a wider variety of programming languages, but result in converters being difficult to develop and that fail to preserve syntactic organization of source code. A universal intermediate level representation that has constructs for a wide variety of programming languages may be both versatile and natural, by comparison, but at the cost of reduced simplicity.

Specifically, SAST algorithms are inherently complex. This complexity is compounded by the complexity of the intermediate level representation being analyzed. Therefore, a universal intermediate level representation that has reduced simplicity—that is, one that has a relatively large number of instructions—is more difficult to utilize within SAST, and further makes such SAST algorithms harder to understand and harder to maintain.

Techniques described herein alleviate these issues by providing for multiple source code representations for SAST. There can be one or multiple intermediate level representations that are suitable for and adapted to the structural analysis portion of SAST, as well as a generalized lower level representation suitable for and adapted to the dataflow analysis portion of SAST. Having multiple levels of representation instead of a single-level representation ensures that the versatility, simplicity, naturalness, preservation, and semantic clarity constraints noted above can be satisfied.

The intermediate level representations may include a programming language-specific intermediate level representation as well as a generalized intermediate level representation that is not specific to any particular programming language. Source code in a given programming language may first be converted to an intermediate level representation specific to that language, and then from that intermediate level representation to the generalized intermediate level representation. Different parts of the structure of the application are retained in these intermediate level representations, such that as a whole the structure is preserved for structural analysis purposes.

The generalized intermediate level representation is then converted to the generalized lower level representation. While the generalized lower level representation may fail to preserve source code structure, the presence of the intermediate level representations results in this being acceptable. The generalized lower level representation instead is sufficiently simple and assembly language-like in many respects to promote ease in dataflow analysis of the application. Therefore, the levels of representation as a whole can satisfy the various constraints noted above.

The techniques described herein leverage the concepts underlying the multiple-level intermediate representation (MLIR) project, which is described at the web site accessible at mlir.llvm.org, only in that the techniques employ multiple levels of representation. The MLIR project concerns an MLIR compiler framework. Specifically, the MLIR project provides for the reuse of compiler infrastructure, which is ordinarily fragmented in use cases and target architectures, across different architectures and for different programming languages.

The MLIR project, however, is unrelated to SAST, and moreover the lower level representation for SAST described herein is very different than the lower level representation contemplated by the MLIR project. That is, the lower level representation developed by MLIR project produces executable code for a given target computing architecture. By comparison, the lower level representation described herein is not executable code. Furthermore, the aims of the MLIR project are at odds with the techniques described herein: a lower level representation that produces executable code is unsatisfactory for SAST, and a lower level representation suitable for SAST cannot be used for MLIR.

For instance, the techniques described herein effectively provide for a pipeline that reduces different source code programming languages into a single generalized lower level representation for dataflow analysis. By comparison, the MLIR project is designed to permit the construction of a compiler pipeline that can ultimately target many different such lower level representations (e.g., assembly languages for various diverse processor architectures). In that sense, the MLIR project is an inversion of the techniques described herein.

For instance, the number of diverse processor architectures is generally larger than the number of source code programming languages. Therefore, rather than funneling source code programming languages into a singular generalized lower level representation for dataflow analysis, as in the techniques described herein, the MLIR project effectively permits conversion of a smaller number of source code programming languages into a larger number of lower level representations. That is, the MLIR project can be considered as a "reverse funneling" in this respect.

FIG. 1 shows an overview of example intermediate level representations 106, 110, and 118 and an example lower level representation 114 to which source code 102 of an application in a given programming language can be converted. In the example, the source code 102 is directly converted, per arrow 104, into an intermediate level representation 106 that is specific to the programming language of the source code 102. The programming language-specific intermediate level representation 106 can then be directly converted, per arrow 108, into a generalized intermediate level representation 110 that is not specific to any programming language. The generalized intermediate level representation 110 can itself be directly converted, per arrow 112, into a generalized lower level representation 114 that is also not specific to any programming language.

However, for some programming languages, rather than converting a programming language-specific intermediate level representation 106 of source code directly to the generalized intermediate level representation 110, the intermediate level representation 106 may instead, per arrow 116, be directly converted to a further intermediate level representation 118. For example, the intermediate level representation 118 may not be specific to a given programming language, but rather to a virtual machine, a runtime engine, or an infrastructure platform with which multiple programming languages are compatible.

The intermediate level representation 118 may then itself be directly converted, per arrow 120, to the generalized intermediate level representation 110, with the intermediate level representation 110 then converted to the generalized lower level representation 114 as has been noted. However, the intermediate level representation 118 may, per arrow 122, instead be converted directly to the generalized lower level representation 114. In this case, the intermediate level representation 118 is not converted to the generalized intermediate level representation 110.

For a given programming language, whether the programming language-specific intermediate level representation 106 of source code 102 in that programming language is converted directly to the generalized intermediate level representation 110 or indirectly via a further intermediate level representation 118 can depend on the similarity of the programming language to other languages, or the rarity of that language. For example, there may be a group of programming languages, including Java and Kotlin, which share the same virtual machine when executed, or a group of programming languages, including JavaScript and Kotlin, which share the same runtime engine when using Kotlin as a language for front-end development.

In these cases, rather than developing a converter for each language that directly converts the programming language-specific intermediate level representation 106 to the generalized intermediate level representation 110, a single converter from the intermediate level representation 118 for the virtual machine or the runtime engine in question to the generalized intermediate level representation 110 may be developed. Only individual converters that each convert the programming language-specific intermediate level representation for a given language to the intermediate level representation 118 have to be created.

Developing a converter from the intermediate level representation 106 to the intermediate level representation 118 may be easier than developing a converter from the representation 106 to the representation 110, warranting the initial effort to develop a converter from the representation 118 to the representation 110. Programming languages that are relatively rare may not warrant the development of a converter from the representation 106 to the representation 110. If such languages share the same virtual machine as a more popular programming language, however, they can leverage the existing converter from the representation 118 for that virtual machine to the representation 110, which justifies the less onerous development of a converter from the representation 106 to the representation 118.

Furthermore, declarative programming languages, such as Bicep and Azure resource manager (ARM) infrastructure code, may lend themselves to programming language-specific intermediate level representations 106 that are difficult to convert to the same generalized intermediate level representation 110 as that to which the representations 106 for non-declarative programming languages, such as Java and C#, can be converted. Rather than modifying the generalized intermediate level representation 110 to accommodate such declarative languages, the intermediate level representations 106 that are specific to the declarative languages may instead be directly converted to a platform-specific intermediate level representation 118 that is directly converted to the generalized lower level representation 114. The generalized intermediate level representation 110 is thus avoided entirely for source code 102 in these programming languages.

Having programming language-specific intermediate level representations 106 for multiple programming languages that can be used to develop applications running on the same platform be translated to the same intermediate level representation 118 for that platform is beneficial for other reason as well. For example, interoperability between these different programming languages with respect to the platform can be more accurately modeled. That is, converting the intermediate level representations 106 for different programming languages into the intermediate level representation 118 for the same platform provides for analytical benefits and not just ease-in-converter development.

Similarly, having the programming language-specific intermediate level representation for a given programming language be able to be converted to multiple intermediate level representations 118 for different platforms provides for deeper understanding as to the particular platform that is of interest. For example, the Kotlin programming language can be used to develop an application that runs on a Java virtual machine as well as an application that runs using a JavaScript runtime engine. For a given application, having the programming-language specific intermediate level representation 106 of its source code 102 converted to an intermediate level representation 118 for the particular platform in which the application will actually be run thus permits more thorough analysis to occur that takes that platform into account.

The various intermediate level representations 106 and/or 116—but not the representation 110—are adapted to the structural analysis 126 portion of SAST. That is, the structure of the source code 102 necessary for the structural analysis 126 of SAST to be performed is retained within the representations 106 and/or 116. The intermediate level representation 110, by comparison, is provided for easier conversion of the representations 106 and 116 to the generalized lower level representation 114. That is, converters do not have to be developed that convert from the representations 106 and 116 directly to the representation 114 in most cases, but instead just to the representation 110. The intermediate level representations 106, 110, and 118, however, are not adapted to and are not suitable for the dataflow analysis 124 portion of SAST.

This permits the intermediate level representations 106, 110, and 118 to be defined without constraints that would otherwise be imposed by the dataflow analysis 124. For example, the intermediate level representations 106, 110, and 118 do not have to clearly represent the behaviors of an application as a flattened series of instructions, which otherwise may be required for dataflow analysis 124, since the representations 106, 110, and 118 are not used for dataflow analysis 124 purposes.

In some implementations, the intermediate level representations 106, 110, and 118 can be ASTs that are increasingly removed from a given programming language from the programming language-specific intermediate level representation 106, to the further intermediate level representation 118, and to the generalized intermediate level representation 110. For example, the representation 106 that is specific to a given programming language may be an AST that includes elements particular to that programming language. By comparison, the representation 106 that is specific to a given virtual machine, runtime engine, or platform is more generalized, and includes elements that are common to the programming languages that share the same virtual machine, runtime engine, or platform. The representation 110 is more generalized still, and includes elements that are not specific to any given programming language.

Within increasing generality may come the obfuscation or destruction of structural elements that are needed or useful for structural analysis 126, however. This is why the generalized intermediate level representation 110 may itself not be sufficient by itself to perform structural analysis 126 in some cases, such that the analysis 126 is performed using the programming language-specific intermediate level representation 106 and, if available, the intermediate level representation 118. That is, the generalized intermediate level representation 110 does not have to be burdened with representing all structure of source code 102, since the representations 110 and/or 118 are used for structural analysis 126 purposes.

In comparison to the intermediate level representations 106, 110, and 118, the generalized lower level representation 114 is adapted to the dataflow analysis 124 portion of SAST. The generalized lower level representation 114 can be considered a flattened sequence of instructions (i.e., as opposed to the instructions in AST-form, as with the intermediate level representations 106, 110, and 118) suitable for performing semantic analysis of the behavior of the application in question. Because the representation 114 is single-purposed in this respect—i.e., the representation 114 is not used for structural analysis 126—structure can be discarded from the intermediate level representation 110 or 118 when generating the lower level representation 114.

The generalized lower level representation 114, in other words, is defined in such a way as to provide easier dataflow analysis 124, without consideration of structural analysis 126. The lower level representation 114 can thus be simpler than if structural analysis 126 considerations would have to be taken into account. Whereas the generalized lower level representation 114 may be assembly language-like in appearance, as noted above the representation 114 is not assembly language, and cannot be used as or to generate executable code. The generalized lower level representation 114 may further look vastly different than the programming language-specific intermediate level representation 106, if not the generalized intermediate level representation 110.

Having a primary generalized intermediate level representation 110 to which intermediate level representations 106 and 118 for the majority of programming languages can be reduced (e.g., other than for declarative programming languages) also permits the generalized lower level representation 114 to be purpose-built for dataflow analysis 124 without regards to the difficulty in creating converters to generate the lower level representation 114. That is, since the programming language-specific intermediate level representations 106 for most programming languages will be reduced (directly or indirectly) to the generalized intermediate level representation 110, this means that converters for the generalized lower level representation 114 do not have to be developed for most programming languages.

For example, even if the generalized lower level representation 114 that is defined results in difficult development of a converter to the generalized lower level representation 114, for most programming languages this does not matter. The converter from the generalized intermediate level representation 110 to the generalized lower level representation 114 is developed once, and is then leveraged for most programming languages insofar as the programming language-specific intermediate level representations 106 are directly or indirectly converted to the intermediate level representation 110. Just for unusual programming languages, such as declarative programming languages, is the difficulty in converting to the generalized lower level representation 114 an issue, insofar as their programming language-specific intermediate level representations 106 are reduced to intermediate level representations 118 converted directly to the lower level representation 114.

The generalized lower level representation 114 can have the following characteristics that render it particularly useful for dataflow analysis 124. First, the lower level representation 114 is an untyped representation of source code 102. Type systems vary too dramatically among programming languages to permit a generalized lower level representation 114 to be both universal and meaningful. Moreover, source language type systems either have no semantics, such that the type systems end after compilation, or have semantics to the extent that types are reflected as runtime values. Therefore, to the extent needed, runtime type information can be encoded using values in the lower level representation alongside ordinary program data.

Second, the generalized lower level representation 114 specifies objects (e.g., variables, arrays, records, and so on) in the source code 102 such that, for each object, a set of fields accessible on the object is not declared in advance of the object in the lower level representation 114. That is, the set of fields accessible on an object is not declared up front or limited in any way. This permits liberal association of dataflow facts to an object by storing analysis data in fields that need not correspond to the actual fields in the source code 102 of the program itself. For example, if an object 'x' is known to contain unsafe data, this information can be encoded using an instruction such as 'x.$taintFlags={"WEB"}', where $taintFlag is a special field used by the taint analysis to track the taint sources flowing into an object.

Third, the generalized lower level representation 114 specifies each function in the source code 102 such that the function has a single formal parameter and no other inputs and outputs. Rather, inputs and outputs of a function are moved into fields to reduce complexity, which is very different than in assembly language by comparison. Multiple positional arguments, named arguments, "varargs," "return values," an implicit "this" parameter, "exceptions", and any other information flowing into or out of a function call are modeled as fields of the single formal parameter, in other words. This ensures that the lower level representation 114 is programming language-agnostic, since some languages allow multiple return values whereas others do not, which is not a feature that has to be considered when performing the dataflow analysis 124.

As noted above, the generalized intermediate level representation 110 may be considered an AST, which is then flattened within the generalized lower level representation 114. For instance, the intermediate level representation 110 may maintain (i.e., include representations of) structural control flow statements and structural expressions present in the source code 102. By comparison, the lower level representation 114 can represent the structural control flow statements as flattened branching statements, and can represent the structural expressions as instruction sequences of constants, unary operations, and binary operations. Examples of the foregoing are provided later in the detailed description.

Figure 2:
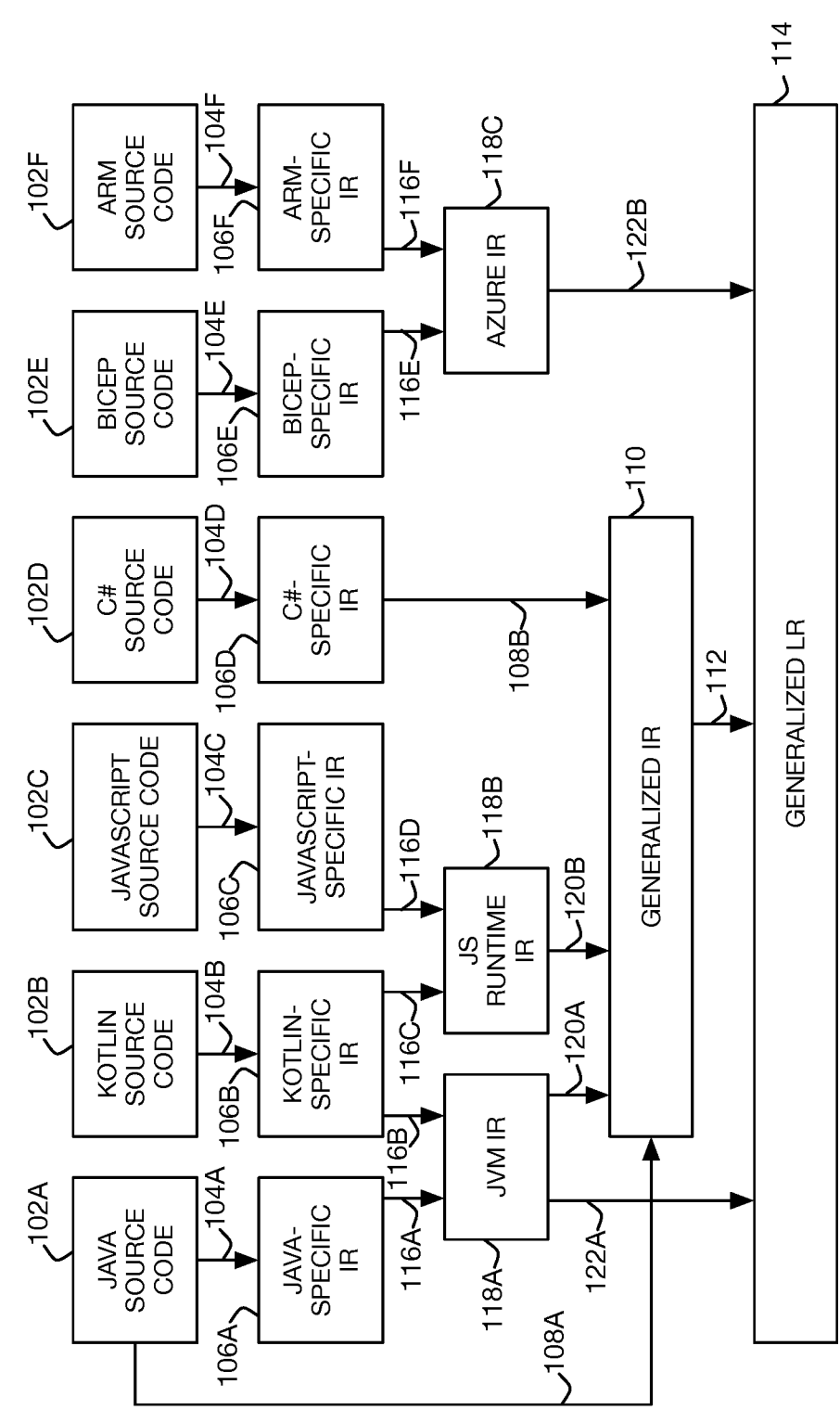
FIG. 2 is a diagram of example intermediate and lower level representations of source code for SAST that is more specific than but consistent with FIG. 1.

FIG. 2 shows an example implementation of the intermediate level representations 106, 110, and 118 and the lower level representation 114 as to particular programming languages. That is, whereas FIG. 1 shows for any arbitrary programming language how source code 102 may be converted among various intermediate level representations 106, 110, and 118 through and to a lower level representation 114, FIG. 2 shows an example of how such conversion may be modeled for particular programming languages in one implementation.

The programming languages in question include Java, Kotlin, JavaScript, C#, Bicep, and ARM Templates (i.e., the language for Azure infrastructure code), for which there is respective source code 102A, 102B, 102C, 102D, 102E, and 102F, which are collectively referred to as the source code 102. Per arrows 104, the source code 102 is directly converted into intermediate representations 106 specific to their respective programming languages. That is, the source code 102A, 102B, 102C, 102D, 102E, and 102F are directly converted, per arrows 104A, 104B, 104C, 104D, 104E, and 104F (which are collectively referred to as the arrows 104) into respectively programming language-specific intermediate representations 106A, 106B, 106C, 106D, 106E, and 106F (which are collectively referred to as the intermediate representations 106).

In the example, the programming language-specific intermediate representation 106A to which Java source code 102A is reduced can be directly converted, per arrow 108A, to the generalized intermediate representation 110. The programming language-specific intermediate representation 106D to which C# source code 102D is reduce may also be directly converted, per arrow 108B, to the generalized intermediate representation 110.

Converters for the programming language-specific intermediate level representations 106A and 106D directly to the generalized intermediate level representation 110 may be developed for Java and C# owing to the commonality of the design, structure, and semantics of these programming languages, where such elements are found in a number of other languages. By comparison, it may not be considered as worth the effort to develop corresponding converters for programming languages, such as Bicep or Prolog, which use fewer common elements or ascribe atypical semantics to the language elements. Moreover, the generalized intermediate level representation 110 may be particularly attuned for non-declarative programming languages, such as Java and C#(among others), and not for declarative programming languages such as Bicep.

The programming language-specific intermediate level representation 106B to which Kotlin source code 102B is reduced may instead be directly converted, per arrow 116B, to a further intermediate level representation 118A for a Java virtual machine (JVM), with which Kotlin is compatible. Such a converter may be easier to develop than a converter from the Kotlin intermediate level representation 106B directly to the generalized intermediate level representation 110. Moreover, insofar as Java is also compatible with the Java virtual machine, a converter may similarly be developed to directly convert, per arrow 116A, a Java intermediate level representation 106A to the JVM intermediate level representation 118A. The JVM intermediate level representation 118A itself is, per arrow 120A, directly converted to the generalized intermediate level representation 110.

Once the JVM intermediate level representation 118A has been defined (and the converter therefrom to the representation 110 developed), converters from programming language-specific intermediate level representations 106 for compatible programming languages to the representation 118A may be developed, which may be easier than developing converters from the representations 106 to the generalized intermediate level representation 110. Therefore, a programming language compatible with the JVM for which it may not be considered as worth the effort to develop a converter from the corresponding programming language-specific intermediate representation 106 to the intermediate level representation 110 may nevertheless take advantage of SAST, since developing a converter from the corresponding representation 106 to the representation 118A is less difficult.

The programming language-specific intermediate level representation 106C to which JavaScript source code 102C is reduced may be, per arrow 116D, be directly converted to a further intermediate level representation 118B that is specific to a JavaScript (JS) runtime engine. As with Kotlin, such a converter may be easier to develop than a converter from the JavaScript intermediate level representation 106C directly to the generalized intermediate level representation 110. Moreover, insofar as Kotlin is also compatible with the JS runtime engine, a converter may similarly be developed to directly convert, per arrow 116C, a Kotlin intermediate level representation 106C to the JS intermediate level representation 118B. The JS intermediate level representation 118B itself is, per arrow 120B, directly converted to the generalized intermediate level representation 110.

As with the JVM, once the JS intermediate level representation 118B has been defined (and the converter therefrom to the representation 110 developed), converters from programming language-specific intermediate level representations 106 for compatible programming languages to the representation 118B may be developed. Such converters may be easier to develop than converters from the representations 106 to the generalized intermediate level representation 110. As such, extending the architecture depicted in FIG. 2 for additional programming languages compatible with JVM may be more likely to occur than if a converter from the JS runtime intermediate level representation 118B to the generalized intermediate level representation 110 not developed.

The Bicep-specific intermediate representation 106E and the ARM-specific intermediate representation 106F are both directly converted, per respective arrows 116E and 116F, to a further intermediate level representation 118C particular to the Azure platform. Bicep and ARM are both declarative programming languages for the Azure platform. Having a common Azure intermediate level representation 118C that is then directly converted, per arrow 122B, to the generalized lower level representation 114 can reduce converter development time.

That is, once the converter from the Azure intermediate level representation 118C to the generalized intermediate level representation 114 has been developed once, the converter can be leveraged for all declarative language particular to the Azure platform. For example, even if the converter from the representation 118C to the representation 114 was originally created in contemplation of ARM infrastructure code, the converter can nevertheless be reused for Bicep source code by developing a converter from the Bicep-specific intermediate level representation 106E to just the Azure-specific intermediate level representation 118C instead of to the representation 114.

The Azure-specific intermediate level representation 118C may be converted directly to the generalized lower level representation 114, as opposed to the generalized intermediate level representation 110, due to the declarative nature of the Bicep and ARM programming languages. For example, the generalized intermediate level representation 110 may have been defined to primarily accommodate non-declarative languages such as Java, C#, and so on. Rather than extending the representation 110 to also accommodate declarative languages, which may render the resulting representation 110 more unwieldy and development of its converter to the representation 114 more complex, the representation 118C can therefore be converted directly to the representation 114 and skip the representation 110 entirely.

FIGS. 3A, 3B, 3C, and 3D respectively show example Java source code 300, and a Java-specific intermediate level representation 320, a generalized intermediate level representation 340, and a generalized lower level representation 114 for this source code 300. Referring to FIG. 3A, the Java source code 300 is an example of the Java source code 102A of FIG. 2. The Java source code 300 is for the function Test. The function Test defines a method foo( ) that provides an integer as output and that receives two Boolean flags flag1 and flag2 and an integer x as input.

The method foo( ) has if-then-else and if-then structural control flow statements. Specifically, if flag1 is true, then the method doX( ) is called. If flag1 is false, however, and if flag2 is true, then the method doY( ) is called. The method doZ( ) is called if flag1 is false regardless of the value of flag2. The methods doX( ), doY( ), and do(Z) are defined by corresponding structural expressions. Once the methods doX( ), doY( ), and/or doZ( ) have been performed, the method Test returns the sum of x and 42.

Referring to FIG. 3B, the Java-specific intermediate level representation 320 is an example of the Java-specific intermediate level representation 106A of FIG. 2 that results by executing a corresponding converter on the Java source code 300 of FIG. 3A. The intermediate level representation 320 is specific to Java, in that source code in other programming languages could not necessarily be converted to the representation 320. The representation 320 is an AST corresponding to the Java source code 300.

The Java-specific intermediate level representation 320 more explicitly specifies the methods defined in the Java source code 300. In the example, the methods foo( ) and doX( ) are particularly shown in the representation 320; the methods doY( ) and doZ( ) are omitted for convenience. Whereas in the source code 300 it is implied that the method foo( ) is not static, this fact may be explicitly called out in the Java-specific intermediate level representation 320 via the line "static: false." Similarly, the type of the value returned by the method may be explicitly indicated on a separate line, as are the method's arguments, and the code that defines the method.

The structural control flow statements may be also more verbosely specified in the intermediate level representation 320 as compared to in the source code 300. For example, the condition of each if statement is explicitly identified on a separate line, as well as what results if the condition evaluates as true. If-then statements are represented as if-then-else statements in which nothing (i.e., "null") is performed if the condition is evaluated as false.

In the Java-specific intermediate level representation 320, references to variables, such as flag1, flag2, and x, may be particularly called out as operations involving access to the variables. For example, rather than simply reciting flag1 as in the Java source code 300, the intermediate level representation 320 recite "JavaVariableAccess("flag1"). Similarly, calls to methods, such as doX( ) and doY( ), may be particularly called out as operations involving calls to the methods. For example, rather than simply reciting doX( ) as in the source code 300, the representation 320 recites JavaCall "Test.doX( )". Likewise, references to integers and other constants are particularly called out as literals. For example, rather than simply reciting the integer 42 as in the source code 300, the representation 320 recites JavaIntegerLiteral(42).

In the Java-specific intermediate level representation 320, mathematical and other operations in the Java source code 300 may be replaced by explicit references to binary and unary operations as appropriate. For example, the mathematical operation "x+42" in the source code 300 is specified in the intermediate level representation 320 as JavaBinaryOperation(INTEGER_PLUS, JavaVariableAccess ("x"), JavaIntegerLiteral(42)). That is, the operation in question is a binary operation in that there are two operands, and the operation is an addition operation performed on integers (e.g., "INTEGER_PLUS").

In general, the Java-specific intermediate level representation in practice may be an in-memory data structure, where the representation 320 of FIG. 3B is effectively a representation of this data structure in the form of text or pseudocode that is known as a "serialized representation." In the case of the Java-specific intermediate level representation 320, this serialized form may be theoretical and not actually used; rather, code (e.g., structural analysis rules and converters) directly operates on the in-memory data structure. The specific representation 320 of FIG. 3B is shown to provide a concrete, readable example.

The specific representation 320 is thus in the form of a language that represents the actual Java-specific intermediate level representation (i.e., the in-memory data structure that is actually used), and the specific representation 320 of FIG. 3B is just one example. However, having a representation that is closer to the original Java source code 300 would not be as informative. The example representation 320 thus provides a maximum amount of information regarding the in-memory data structure that is used.

For example, the representation 320 includes the lines 'JavaIf {', 'condition: JavaVariableAccess("flag1")', and 'then: JavaCall "Test.doX( )"[ ]. The condition is thus made explicit. Having these lines instead of lines that are closer to the original Java source code 300, such as 'JavaIf(JavaVariableAccess("flag1")) {' and 'then: JavaCall "Test.doX( )"[ ]' ensures that the condition is not hidden, and is more readily discernible and therefore informative.

As another example, the representation 320 includes 'JavaBinaryOperation(INTEGER_PLUS, JavaVariableAccess("x"), JavaIntegerLiteral(42))'. This is beneficial as compared to just including 'x+42' so that further information is provided. That is, aspects that are implicit or inherent in 'x+42' in the Java source code 300 are made more explicit for informational purposes.

Ultimately, the in-memory data structure—and of which the depicted representation 320 of FIG. 3B is effectively an example of—is used in two ways. First, the in-memory data structure is used for structural rules that read the data structure to identify whether its rules match the structure. Having a verbose representation 320 is beneficial to make development of such rules easier. Second, the in-memory data structure is converted to a lower-level representation. Having a verbose representation 320 is similarly beneficial to make development of such converters easier.

As a concrete example, converting both if-then and if-then-else control flow statements in the Java source code 300 into the same type of if-then-else control flow statement in the representation 320 reduces the number of data structures needed for these two types of control flow statements. That is, an if-then control flow statement is effectively converted to be an if-then-else control flow statement with "null" as the "else." Therefore, developers of rules and converters just have to take into account a singular if-then-else type of control flow statement, instead of taking into account both an "f-then (with no else) and an if-then-else type.

The representation 320 further delineates identifiers in the Java source code 300 so that they are globally unique, and thus canonical and fully qualified. For example, in the source code 300, there is a static method doX( ) in the class Test. In the representation 320, this method is referred to as Test.doX( ) to ensure that it is globally unique. That is, another class (e.g., Test2) may also coincidentally have a static method referred to as doX( ), so referring to the method doX( ) of the class Test as Test.doX( ) ensures that it is not confused with the method doX( ) of the class Test2, which may be referred to as Test2.doX( ).

The Java source code 300 is converted to the Java-specific intermediate level representation 320—instead of directly to the generalized intermediate level representation 340 (or directly to a JVM-specific intermediate level representation 118A)—so that there is an intermediate level representation 320 that is specific to the programming language of the source code 300. The intermediate level representation 320 can include structural features that are removed from other intermediate level representations (e.g., the generalized intermediate level representation 110) to which the representation 320 is subsequently reduced. These structural features may be important for subsequent structural analysis of the source code 300.

Referring to FIG. 3C, the generalized intermediate level representation 340 is an example of the generalized intermediate level representation 110 of FIG. 2 that results by executing a corresponding converter on the Java-specific intermediate level representation 320 of FIG. 3B. The generalized intermediate level representation 340 is referred to in shorthand as "MIR" in FIG. 3C. The generalized intermediate level representation 340 is not specific to Java or any other programming language. That is, source code that corresponds to the Java source code 300 in that it performs the same functionality as the source code 300 would result in the same representation 340 even though the source code was not written in Java. The representation 340 is an AST corresponding to the intermediate level representation 320.

Unlike the Java-specific intermediate level representation 320, which is more verbose than the Java source code 300, the generalized intermediate level representation 340 is less verbose than the Java source code 300. The representation 340 is thus a compact source code representation that is further not specific to any programming language. In the example, the methods foo( ) and do(X) are particularly shown in the representation 340, whereas the methods doY( ) and doZ( ) are omitted for convenience.

In the generalized intermediate level representation 340, inputs and outputs of methods are specified as type-less fields of objects corresponding to the methods (as they will be in the generalized lower level representation 360). For instance, as to the method foo( ), the input flag1, flag2, and x are referenced as % 0.<arg:0>, % 0.<arg:1>, and % 0.<arg:2>, respectively, where % 0 identifies a function or method. This is because the details of argument parsing can significantly vary in different programming languages (e.g., in addition to formal parameters corresponding to positional arguments, there may be named arguments, keyword arguments, variable length arguments, and so on). Therefore, to ensure that the generalized intermediate level representation 340 is programming language-agnostic, it employs a single-argument model.

More specifically, for instance, in Java, the names of method parameters are meaningful only within the method itself. Any callers of foo( ) need not and cannot know that the parameters are named flag1, flag2, and x. The caller is only aware that there are three parameters, to be passed in order as the first, second, and third parameters.

Therefore, to model the behavior in the generalized intermediate level representation 340, which permits exactly one formal method parameter, a calling convention is established that the callers of foo( ) shall pass the three desired values by writing them to the fields <arg:0>, <arg:1>, and <arg:2>, respectively, of the single method parameter. Then, within the method foo( ), three named variables, flag1, flag2, and x are created by reading the values from the same fields of the formal parameter. This choice of calling convention can be specific to the conversion of Java to the generalized intermediate level representation 340. Other languages may have different behaviors that warrant different choices of calling convention.

Furthermore, the generalized intermediate level representation 340 includes this :=% 0<this>. Since Java is an object-oriented language, the code consists of classes that combine code (methods) with data (fields). Code in the method can access the fields. To implement object-oriented languages in hardware, the object for which a method is called is provided as an implied parameter called "this," which is also known as the "receiver" of the invocation.

Stated another way, since foo( ) is a non-static Java method, it has an implicit method parameter named "this," which refers to the receiver object on which foo( ) was invoked. This behavior is made explicit in the representation 340, and thus not Java-specific. Therefore, the representation 340 has a calling convention that callers of foo( )

explicitly write the desire value of "this" to a field of the formal parameter, named <this>. Just as the method obtains its positional arguments from fields <arg:0>, <arg:1>, and so on, the method obtains the value for "this" from the field <this>.

The Java-specific references in the intermediate level representation 320 are replaced by generalized references in the intermediate level representation 340 since the representation 340 is not specific to Java. For example, JavaCall "Test.doX( )" is replaced by direct call "Test"::"doX" (<alloc>), where "<alloc>" is included because formally, an argument is needed (since a single argument is required for any function invocation), but materially, there is nothing to provide, since the method does not take any parameters. Therefore, an empty object is allocated. Similarly, JavaReturn is replaced by simply writing the desired return value to a field of the formal parameter, <return>, which serves as the way to communicate the returned value to the caller, which shall read from this field. (JavaBinaryOperation is replaced by binaryOperation, and JavaIntegerLiteral is replaced by constantOperation, where the value 42 is called out as "ir0-int-literal".

While the generalized intermediate level representation 340 more concisely (i.e., less verbosely) corresponds to the Java source code 300 as compared to the Java-specific intermediate level representation 320, it nevertheless retains the structural control statements of the source code 300 in non-flattened form. For example, as in the source code 300 and the representation 320, the if-then-else structural control flow statements remain in the representation 340, and the if-then structural control flow statements are still nested (i.e., are in non-flattened form) in the representation 340. This is indicated in the representation 340 by the terminology "sequence."

The control flow statements remain non-flattened in the representation 340, because the transformation from complex control structures found in real programming language to the flattened representation in the generalized intermediate level representation 340 is complex. By permitting complex structures in the representation 340, the transformation of language-specific intermediate level representations (e.g., the representation 320) into that representation 340 remains straightforward, because flattening does not have to be performed. Rather, flattening occurs only once, when converting from the generalized intermediate level representation 340 to the generalized lower level representation, as is now described.

Referring to FIG. 3D, the generalized lower level representation 360 is an example of the generalized lower level representation 114 of FIG. 2 that results by executing a corresponding converter on the generalized intermediate level representation 340 of FIG. 3C. The generalized lower level representation 340 is referred to in shorthand as IR0 in FIG. 3D. The generalized lower level representation 340 is, like the generalized intermediate level representation 320, not specific to Java or any other programming language. The representation 360 corresponds to AST of the representation 340 but in flattened form. As with the representation 340, the methods foo( ) and doX( ) are particularly shown in the representation 360, but the methods doY( ) and doZ( ) are omitted for convenience.

The generalized lower level representation 360 replaces names of inputs and outputs with less descriptive identifiers. For example, flag1, flag2, and x are respectively replaced with % 1, % 2, and % 3. This is to change names into static single assignment (SSA) form. (By comparison, the names of inputs and outputs may be useful in the structural analysis, which is why they are still included in the generalized intermediate level representation 340.)

More specifically, named variables in the generalized intermediate level representation 340 represent memory locations that can be reassigned. That is, each variable can take on one or more different values over the course of program execution, in accordance with the fact that such mutable variables are commonplace in programming languages.

However, a dataflow analysis is simpler and easier to implement under the assumption that the value of a variable does not change over time. One way to eliminate mutable variables is to employ SSA, which replaces every mutable variable with multiple immutable variables, each of which is assigned a value at a single place in the program. These immutable variables, which are also called "values", are in one-to-one correspondence, and are named as % 1, % 2, % 3 in the low level representation, since their original names are no longer meaningful.

Furthermore, the structural control statements of the source code 300 are flattened from the generalized intermediate level representation 340 to the generalized lower level representation 360. In the generalized intermediate level representation 340, the if (flag 2) conditional statement of the source code 300 is still nested (i.e., non-flattened) within the else part of the if (flag 1)-else conditional statement. By comparison, in the generalized lower level representation 360, the if (flag 2) conditional statement is no longer nested within the else part of the if (flag 1)-else conditional statement. Rather, the statements are flattened in a more assembly language-like manner.

Specifically, the if (flag 1)-else conditional statement is represented as cond branch (% 1) block(1), block(2), where % 1 corresponds to flag1, and block(1) and block(2) correspond to subsequent parts of the lower level representation 360. In block(1), which is proceeded to when flag1 is true, another part of the representation 360, identified as block(3), is jumped to after the method doX( ) is called, per the terminology branch. In block(2), which is proceeded to when flag1 is false, the if (flag 2) condition statement is represented as cond branch (% 2) block(4), block(5), where % 2 corresponds to flag. In block(4), which is proceeded to when flag2 is true, block(5) is jumped to after the method doY( ) is called, no differently than when flag2 is false in block(2). Block(5) includes calling the method doZ( ), followed by jumping to block(3) no differently than when flag1 is false in block(1).

In this way, nested control flow statements such as if-then and if-then-else statements are replaced in the generalized lower level representation 360 with a series of code sections identified as separate blocks. At the conclusion of each block other than the last block of a function, another, subsequent block is jumped to. That is, a control flow statement is replaced by a simple if-then-else statement including a condition that can evaluate as true or false, a block that is branched to when the condition evaluates as true, and a block that is branched to when the condition evaluates as false (e.g., cond branch (% 1) block(1), block(2) and cond branch (% 2) block(4), block(5) in the example).

The generalized lower level representation 360 thus effectively corresponds to the generalized intermediate level representation 340, but with the control flow statements of the latter being flattened. Not flattening the control flow statements in the intermediate level representation 340 is useful for structural analysis. For instance, an example of the utility of structured loops in a structural analysis is that it allows for readily identifying the expression that is the loop condition, as well as discovering other loop exit points, in the form of break statements. If subsequent dataflow queries report that all the loop exit conditions are always false, the analysis can report an infinite loop in the program. Achieving this kind of analysis without structured loop information is more difficult, essentially requiring a bespoke algorithm to reconstruct the loops from a flat control flow graph, which is beyond the scope of a general-purpose lattice-solving dataflow analysis.

By comparison, flattening the control flow statements in the lower level representation 360 is useful for dataflow analysis, by making such dataflow analysis simpler. As noted above, structured control flow constructs are numerous and come with many variations: if-then, if-then-else, while, do, for, ranged for, iterator for, and switch. Some refer to non-local context specific information; for example, break and continue are typically in reference to the nearest enclosing loop. However, all can be flattened to a much simpler and more uniform set of lower level control flow instructions: branch and conditional branch. The dataflow analysis then only has to handle these two cases.

Figure 4:
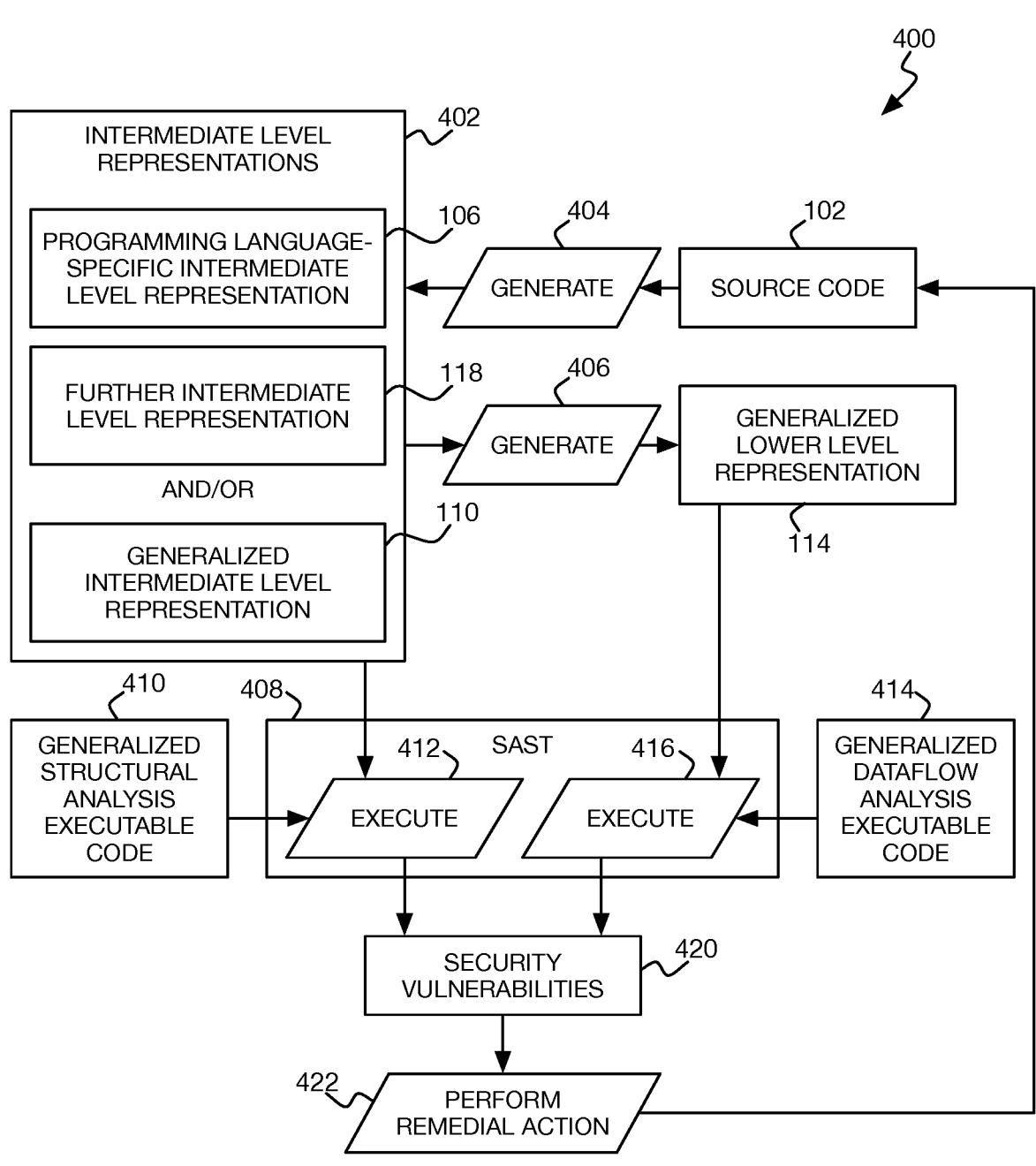
FIG. 4 is a diagram of an example process by which intermediate level representations and a generalized lower level representation of source code are generated so that SAST of the source code can be performed.

FIG. 4 shows an example process by which intermediate level representations 402 and a generalized lower level representation 114 are generated so that SAST 408 can be performed to identify security vulnerabilities 420 within the source code 102. Specifically, the intermediate level representations 402 are generated (404) from the source code 102 in a given programming language. The intermediate level representations 402 can include a programming-language specific intermediate level representation 106, a further intermediate level representation 118, and/or a generalized intermediate level representation 110, as has been described. As one example, the programming language-specific intermediate level representation 106 may be generated directly from the source code 102, and the generalized intermediate level representation 110 may be directly generated from the intermediate level representation 106, such that there is not a further intermediate level representation 118.

As another example, the intermediate level representation 106 may again be generated directly from the source code 102, but with a further intermediate level representation 118 then generated directly from the representation 106 and a generalized intermediate level representation 110 generated directly from the intermediate level representation 118. The generalized lower level representation 114 is generated (406) from the intermediate level representations 402. For instance, the lower level representation 114 may be generated directly from the generalized intermediate level representation 110.

SAST 408 of the source code 102 is then performed. As has been noted, structural analysis is performed using the intermediate level representations 402, whereas dataflow analysis is performed using the generalized lower level representations 114. In the example, the structural analysis portion of the SAST 408 is performed by executing (412) generalized structural analysis executable code 410 on the intermediate level representations 402 (and not on the generalized lower level representation 114). In some implementations, the executable code 410 is executed on at least the generalized intermediate level representation 110 in particular, but not necessarily exclusively. That is, the code 410 may also be executed on the intermediate level representation 106 and/or 118.

The generalized structural analysis executable code 410 performs structural analysis by applying rules to the intermediate level representations 402, where these rules may be encoded directly within the code 410, in order to identify security vulnerabilities 420 that are structural in nature. The rules effectively correspond to queries for structure-oriented static analyses, such that application of the rules is tantamount to executing the queries.

The rules may be in one of two forms. A first type of rule accesses features at a specified intermediate level representation 402. Some rules can be applied to the generalized intermediate level representation 110 that are applicable regardless of the programming language of the source code 102, since the representation 110 is not source code specific. Other rules, by comparison, may be applicable to a programming language-specific intermediate level representation 106 for a particular programming language, or to an intermediate level representation 118 for a virtual machine, runtime engine, or infrastructure platform for a particular set of programming languages. These latter rules, therefore, are not always applied; rules pertaining to representations 106 and 118 for programming languages different than the programming language of the source code 102 are not applied, for instance. The generalized structural analysis executable code 410 is generalized in that it can apply any type of rule to any specified intermediate level representation 402.

This first type of rule may be able to inject instructions within a subsequent intermediate level representation 402. For instance, a rule operating on the programming language-specific intermediate level representation 106 may introduce instructions in the generalized intermediate level representation 110. In the case of taint analysis, for example, taint source/sink instructions may be introduced in the representation 110.

The first type of rule permits security vulnerabilities 420 to be identified that are purely structural in nature, and thus which do not need any type of dataflow analysis to be performed for their identification. As a rudimentary example, Java source code may include the line String password="abcd". Because the variable in question has been named "password," this may be considered a potential security vulnerability. Dataflow analysis is not needed to perform this type of structural analysis.

A second type of structural analysis rule can be considered a function written in the programming language of the source code 102 in question, so as to model the behavior of a library function used by the application being analyzed. The provided definition of the function can provide specialized vulnerability analysis functions (e.g., taint source/sink functions) that may ultimately be converted to instructions in the generalized intermediate level representation 110 via application of rules of the first type.

For instance, the second type of rule can identify a library function of interest in the programming language-specific intermediate level representation 106, and replace it with a synthetic function that provides the desired vulnerability analysis when dataflow analysis is performed. This synthetic function is converted to corresponding instructions in the generalized lower level representation 114 during generation of the representation 114 from the intermediate level representation 110.

Application of this second type of rule is considered structural analysis insofar as the rule is applied before dataflow analysis is performed. However, the purpose of this type of rule is to ultimately introduce relevant instructions into the generalized lower level representation 114 so that the dataflow analysis properly identifies particular types of potential security vulnerabilities. Without the information that is ultimately introduced into the lower level representation 114 via application of the second type of rule, the dataflow analysis would not be able to identify particular types of vulnerabilities.

An example of rules of the second type are source and sink rules. For example, the Java method java.io.Console#readPassword( ) should be modeled to return confidential data, before the dataflow analysis begins. As another example, the Java String concat( ) method should have a function-modeling rule. If either of its two inputs is a tainted string, then its output should also be tainted. A synthetic definition for this library method can thus be substituted that exhibits this behavior.

The dataflow analysis of the SAST 408 is performed in the example by executing (416) generalized dataflow analysis executable code 414 only on the generalized lower level representation 114 (and not on the intermediate level representations 402), to identify security vulnerabilities 420 that are behavioral, as opposed to structural, in nature. The generalized dataflow analysis executable code 414 may perform specified dataflow-oriented static analyses by applying a superlattice (i.e., a lattice product) of lattices corresponding to the static analyses against the generalized lower level representation 114. Such dataflow analysis is described in the pending US patent application having application Ser. No. 18/239,011, and filed on Aug. 28, 2023, which is hereby incorporated by reference. The dataflow analysis executable code 414 is generalized in that it can apply any type of static analysis defined by a lattice.

Ultimately, the end result of the structural analysis portion of SAST 408 that is performed by executing the generalized structural analysis executable code 410 on the intermediate level representation 402 and the generalized dataflow analysis executable code 404 on the generalized lower level representation 114 is the identification of security vulnerabilities 420. The output of the security vulnerabilities 420 can include those statements delineated in the source code 102 involving variables pertaining to the security vulnerabilities. The specific line numbers of the source code 102, or the lines of source code 102 themselves may be provided in the output. For example, if the source code 102 contains a statement that is a taint sink, then this sink statement and its location within the source code 102 may be reported as a security vulnerability 420.

Once the security vulnerabilities 420 have been identified, a remedial action may be performed (422) with respect to the source code 102 to resolve (or at least lessen the impact of) the vulnerabilities 420 within the source code 102. For example, the source code 102 of the application may be modified by a developer so that ultimate execution of the application will not result in the security vulnerabilities 420. As another example, for some types of security vulnerabilities 420, the source code 102 may be automatically modified to remove the vulnerabilities 420. Once the remedial action has been performed, the intermediate level representations 402 and the lower level representation 114 may again be generated and SAST 408 again performed to identify whether the security vulnerabilities 420 have been removed, or whether new vulnerabilities 420 have been introduced.

The process 400 therefore provides for improved execution of applications on computing devices, in that the process 400 ensures that the applications will have fewer (or no) security vulnerabilities 420. The inspection of source code 102 for security vulnerabilities 420 on the order that the process 400 can provide via the representations 402 and 114 is largely intractable if it were performed manually by developers (or other users) themselves. The source code 102 for a modern application can have tens of thousands or more of lines of source code, and some types of security vulnerabilities 420 can escape detection by even the most knowledgeable and discerning person. The process 400 is thus not one that could be performed manually to any practicable degree.

This is underscored by security testing such as SAST being considered as a technology that is used by application developers to identify security vulnerabilities within source code so that the vulnerabilities can be removed. The techniques described herein provide for the generation of intermediate level representations 402 and a generalized lower level representation 114 that permit such SAST to be performed more efficiently. The techniques thus improve security testing technology, and more particularly SAST technology. Moreover, the generalized lower level representation 114 is not a representation that would be used if an application developer or other user were to manually inspect source code 102 for vulnerabilities.

Figure 5:
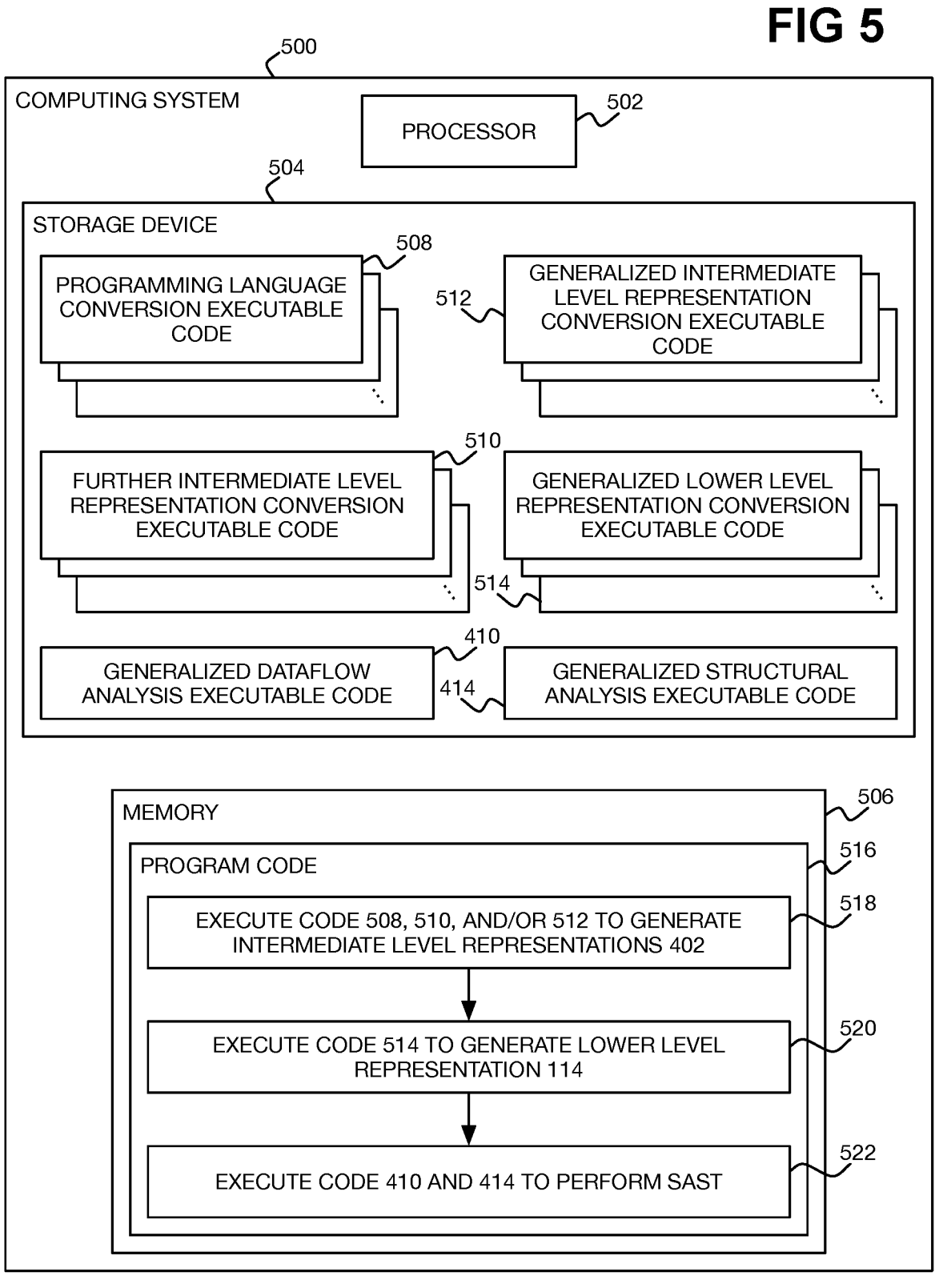
FIG. 5 is a diagram of an example computing system for generating intermediate level representations and a generalized lower level representation of source code for performing SAST of the source code.

FIG. 5 shows an example computing system 500. The system 500 includes a processor 502, a storage device 504, and a memory 506. The storage device 504 can also be referred to as storage hardware or a storage circuit, and can include a hard disk drive, a solid-state drive, or another type of storage device. The storage device 504 can store the generalized dataflow analysis executable code 410 and the generalized structural analysis executable code 414 that have been described.

The storage device 504 can further store programming language conversion executable code 508 for each programming language in which source code 102 is to be converted into a corresponding programming language-specific intermediate level representation 106. In the example implementation of FIG. 2, for instance, there may be separate executable code 508 for the conversion represented by each of the arrows 104A, 104B, 104C, 104D, 104E, and 104F.

Execution of a given programming language conversion executable code 508 directly converts source code 102 in a respective programming language to a corresponding representation 106. For example, there may be executable code 508 for Java to convert Java source code 102 to a Java-specific intermediate level representation 106; executable code 508 for C# to convert C# source code 102 to a C#-specific intermediate level representation 106; etc.

The storage device 504 can store further intermediate level representation conversion executable code 510. Each intermediate level representation conversion executable code 510 is for a particular programming language and a particular virtual machine, runtime engine, or infrastructure platform with which the programming language is compatible. In the example implementation of FIG. 2, for instance, there may be separate executable code 510 for the conversion represented by each of the arrows 116A, 116B, 116C, 116D, 116E, and 116F.

Execution of a given intermediate level representation conversion executable code directly converts an intermediate level representation 106 specific to a corresponding programming language to a further intermediate level representation 118 for a corresponding virtual machine, runtime engine, or infrastructure platform. As one example, there may be further intermediate level representation conversion executable code 510 for Kotlin and a JVM to convert a Kotlin-specific intermediate level representation 106 to an intermediate level representation 118 for JVM.

The storage device 504 can also store generalized intermediate level representation conversion executable code 512. Each generalized intermediate level representation conversion executable code 512 is for a particular programming language or for a particular virtual machine, runtime engine, or infrastructure platform. In the example implementation of FIG. 2, for instance, there may be separate executable code 512 for the conversion represented by each of the arrows 108A, 108B, 120A, and 120B.

Execution of a given intermediate generalized intermediate level representation conversion executable code 512 specific to a corresponding programming language directly converts an intermediate level representation 106 specific to that programming language to the generalized intermediate level representation 110. For example, there may be executable code 512 for Java to directly convert a Java-specific intermediate level representation 106 to the generalized intermediate level representation 110; executable code 512 for C# to directly convert a C#-specific intermediate level representation 106 to the representation 110; and so on.

Execution of a given intermediate generalized intermediate level representation conversion executable code 512 specific to a corresponding virtual machine, runtime engine, or infrastructure platform, by comparison, directly converts an intermediate level representation 118 for that virtual machine, runtime engine, or infrastructure platform to the generalized intermediate level representation 110. As one example, there may be executable code 512 for JVM to convert an intermediate level representation 118 specific to JVM to the generalized intermediate level representation 110.

The storage device 504 can further storage generalized lower level representation conversion executable code 514. Each generalized lower level representation conversion executable code 514 may be specific to the generalized intermediate lower level representation 110 or to the further intermediate level representation 118 for a particular virtual machine, runtime engine, or infrastructure platform. For example, in the example implementation of FIG. 2, there may be executable code 514 for the conversion represented by each of the arrows 112, 122A, and 122B.

Execution of the executable code 514 for the generalized intermediate level representation 110 directly converts the intermediate level representation 110 to the generalized lower level representation 114. Execution of the executable code 514 for a particular virtual machine, runtime engine, or infrastructure platform, by comparison, directly converts the further intermediate level representation 118 for that virtual machine, runtime engine, or infrastructure platform to the generalized lower level representation. For example, there may be executable code 514 for JVM to convert an intermediate level representation 118 specific to JVM to the generalized lower level representation 114.

The memory 506 stores program code 516 executable by the processor 502 to perform processing. The processing includes executing the executable code 508, 510, and/or 512 as appropriate to generate the intermediate level representations 402 for source code 102 in a particular programming language (518). As one example, if the source code 102 is in Java, the executable code 508 for Java may be executed to convert the source code 102 to a Java-specific intermediate level representation 106. The executable code 512 for Java may then be executed to convert this intermediate level representation 106 to the generalized intermediate level representation 114.

The processing includes executing the appropriate executable code 514 to convert the generalized intermediate level representation 110 to the generalized lower level representation 114 (520). In the example of the previous paragraph, for instance, the executable code 514 for the generalized intermediate level representation 114 may be executed to convert the representation 114 to the representation 114. The processing can include then executing the executable code 410 and 414 to perform SAST 408 (522). For instance, the executable code 410 may first be executed to perform the structural analysis portion of SAST 408, and then the executable code 414 may be executed to perform the dataflow analysis portion of SAST 408.

FIG. 6 shows an example non-transitory computer-readable data storage medium 600 storing program code 602 executable by a processor to perform processing. The memory 506 of FIG. 5 is one type of such a data storage medium 600, and the processing performed by executing the program code 602 is consistent with that performed by executing the program code 516 of FIG. 5. Furthermore, the processor that executes the program code 602 may be the processor 502 of FIG. 5. The processing includes receiving source code 102 in a programming language (604), and converting the source code to a generalized intermediate level representation 110 (606).

For instance, the source code 102 may first be directly converted to a programming language-specific intermediate level representation 106 (608). Then, the representation 106 may either be directly converted to a further intermediate level representation 118 that is directly converted to the generalized intermediate level representation 110 (610), or the representation 106 may be directly converted to the representation 110 (612). The processing includes then directly converting the generalized intermediate level representation 110 to the generalized lower level representation 114 (614), followed by performing SAST 408 (616) as has been described.

Techniques have been described that provide for multiple representations of source code for SAST. The representations can include multiple intermediate level representations to permit the structural analysis portion of SAST to be performed, as well as a generalized lower level representation to permit the dataflow analysis portion of SAST to be performed. Having multiple representations instead of a single representation permits the lower level representation to be universal and to be attuned for dataflow analysis, without saddling the lower level representation with structural complexity that would otherwise be needed if structural analysis were performed using the lower level representation. Having multiple intermediate level representations, as opposed to a single intermediate level representation, further provides for ease of development of the converters for different programming languages.

We claim:

1. A non-transitory computer-readable data storage medium storing program code executable by a processor to perform processing comprising:

receiving source code in a programming language;

converting the source code to a generalized intermediate level representation not specific to any programming language;

converting the source code from the generalized intermediate level representation to a generalized lower level representation adapted to a dataflow analysis portion of static application security testing (SAST), the generalized lower level representation not specific to any programming language;

causing the SAST to be performed on the source code using the generalized intermediate level representation and the generalized lower level representation, by:

executing generalized dataflow analysis executable code on the generalized lower level representation of the source code using a lattice product of lattices corresponding to dataflow-oriented static analyses specified by a superlattice for the SAST; and executing generalized structural analysis executable code to perform queries corresponding to structure-oriented static analyses specified by the SAST.

2. The non-transitory computer-readable data storage medium of claim 1, wherein the generalized structural analysis executable code is not executable on the generalized lower level representation of the source code, and is not exclusively executable on the generalized intermediate level representation of the source code.

3. The non-transitory computer-readable data storage medium of claim 1, wherein the processing further comprises:

in response to the SAST identifying a security vulnerability in the source code, performing a remedial action regarding the source code to resolve the security vulnerability.

4. The non-transitory computer-readable data storage medium of claim 1, wherein converting the source code to the generalized intermediate level representation comprises:

converting the source code directly from the programming language to a programming language-specific intermediate level representation higher than the generalized intermediate level representation; and converting the source code from the programming language-specific intermediate level representation to the generalized intermediate level representation, wherein the programming language-specific intermediate level representation is adapted to a structural analysis portion of the SAST.

5. The non-transitory computer-readable data storage medium of claim 4, wherein converting the source code from the programming language-specific intermediate level representation to the generalized intermediate level representation comprises:

converting the source code directly from the programming language-specific intermediate level representation to a further intermediate level representation that is not specific to the programming language but is specific to a virtual machine or a runtime engine with which the programming language is compatible; and converting the source code directly from the further intermediate level representation to the generalized intermediate level representation, wherein the further intermediate level representation is adapted to the structural analysis portion of the SAST.

6. The non-transitory computer-readable data storage medium of claim 4, wherein converting the source code from the programming language-specific intermediate level representation to the generalized intermediate level representation comprises converting the source code directly from the programming language-specific intermediate level representation to the generalized intermediate level representation.

7. The non-transitory computer-readable data storage medium of claim 1, wherein converting the source code from the generalized intermediate level representation to the generalized lower level representation comprises converting the source code directly from the generalized intermediate level representation to the generalized lower level representation.

8. The non-transitory computer-readable data storage medium of claim 1, wherein the generalized lower level representation is an untyped representation of the source code.

9. The non-transitory computer-readable data storage medium of claim 1, wherein the generalized lower level representation specifies an object in the source code such that a set of fields accessible on the object is not declared in advance of the object in the generalized lower level representation.

10. The non-transitory computer-readable data storage medium of claim 1, wherein the generalized lower level representation specifies each of a plurality of functions in the source code such that each function has a single formal parameter and no other inputs or outputs.

11. The non-transitory computer-readable data storage medium of claim 1, wherein the generalized intermediate level representation maintains structural control flow statements and structural expressions in the source code, and wherein the generalized lower level representation represents the structural control flow statements as flattened branching statements and the structural expressions as instruction sequences of constants, unary operations, and binary operations.

12. A computing system comprising:

a storage device storing:

lower level representation conversion executable program code that directly converts a generalized intermediate level representation of source code to a generalized lower level representation of the source code, neither the generalized intermediate level representation nor the generalized lower level representation being specific to any programming language, the generalized lower level representation adapted to a dataflow analysis portion of static application security testing (SAST);

programming language conversion executable program code that converts the source code directly from a programming language of the source code to a programming language-specific intermediate level representation of the source code, the programming language-specific intermediate level representation adapted to a structural analysis portion of the SAST;

intermediate level representation conversion executable program code that directly converts the programming language-specific intermediate level representation of the source code to the generalized intermediate level representation of the source code;

a processor; and a memory storing program code executable by the processor to:

receive the source code in the programming language;

execute the programming language conversion executable program code on the source code in the programming language to generate the programming language-specific intermediate level representation of the source code;

execute the intermediate level representation conversion executable program code on the programming language-specific intermediate level representation of the source code to generate the generalized intermediate level representation of the source code; and execute the lower level representation conversion executable code on the generalized intermediate level representation of the source code to generate the generalized lower level representation of the source code.

13. The computing system of claim 12, wherein the storage device further stores:

generalized dataflow analysis executable code that performs lattice evaluation exclusively on the generalized lower level representation using a lattice product of lattices corresponding to dataflow-oriented static analyses specified by a superlattice for the SAST; and generalized structural analysis executable code that performs queries on the programming language-specific intermediate level representation and not on the generalized lower level representation, the queries corresponding to structure-oriented analysis specified by the SAST, and wherein the program code stored in the memory is executable by the processor to further cause the SAST to be performed on the source code by executing the generalized dataflow analysis executable code and the generalized structural analysis executable code.

14. The computing system of claim 13, wherein the program code stored in the memory is executable by the processor to further, in response to the SAST identifying a security vulnerability in the source code, perform a remedial action regarding the source code to resolve the security vulnerability.

15. The computing system of claim 12, wherein the generalized lower level representation is an untyped representation of the source code, wherein the generalized lower level representation specifies an object in the source code such that a set of fields accessible on the object is not declared in advance of the object in the generalized lower level representation, wherein the generalized lower level representation specifies each of a plurality of functions in the source code such that each function has a single formal parameter and no other inputs or outputs, wherein the generalized intermediate level representation maintains structural control flow statements and structural expressions in the source code, and wherein the generalized lower level representation represents the structural control flow statements as flattened branching statements and the structural expressions as instruction sequences of constants, unary operations, and binary operations.

16. A method comprising:

receiving, by a processor, source code in a first programming language;

directly converting, by the processor, the source code from the first programming language to a first programming language-specific intermediate level representation adapted to a structural analysis portion of static application security testing (SAST);

directly converting, by the processor, the first programming language-specific intermediate level representation to a generalized intermediate level representation of the source code, the generalized intermediate level representation not specific to any programming language;

directly converting, by the processor, the generalized intermediate level representation of the source code to a generalized lower level representation of the source code adapted to a dataflow portion of the SAST, the generalized lower level representation not specific to any programming language;

executing, by the processor, generalized dataflow analysis executable code on the generalized lower level representation of the source code using a lattice product of lattices corresponding to dataflow-oriented static analyses specified by a superlattice for the SAST; and executing, by the processor, generalized structural analysis executable code on the first programming language-specific intermediate level representation of the source code to perform queries corresponding to structure-oriented static analyses specified by the SAST.

17. The method of claim 16, wherein the source code is first source code, further comprising:

receiving, by the processor, second source code in the programming language;

directly converting, by the processor, the second source code from the programming language to a second programming language-specific intermediate level representation of the second source code;

directly converting, by the processor, the second programming language-specific intermediate level representation of the second source code to a further intermediate level representation that is not specific to the programming language but is specific to a virtual machine or a runtime engine with which the programming language is compatible;

directly converting, by the processor, the further intermediate level representation to the generalized intermediate level representation of the second source code;

directly converting, by the processor, the generalized intermedial level representation of the second source code to the generalized lower level representation of the second source code;

executing, by the processor, the generalized dataflow analysis executable code on the generalized lower level representation of the second source code using the lattice product of the lattices corresponding to the dataflow-oriented static analyses specified by a superlattice for the SAST; and executing, by the processor, the generalized structural analysis executable code on the generalized intermediate level representation of the second source code to perform the queries corresponding to the structure-oriented static analyses specified by the SAST.

18. The method of claim 16, wherein the generalized lower level representation is an untyped representation of the source code, wherein the generalized lower level representation specifies an object in the source code such that a set of fields accessible on the object is not declared in advance of the object in the generalized lower level representation, wherein the generalized lower level representation specifies each of a plurality of functions in the source code such that each function has a single formal parameter and no other inputs or outputs, wherein the generalized intermediate level representation maintains structural control flow statements and structural expressions in the source code, and wherein the generalized lower level representation represents the structural control flow statements as flattened branching statements and the structural expressions as instruction sequences of constants, unary operations, and binary operations.

* * * * *